United States Patent
Gentile (10) Patent No.: US 9,583,989 B2
(45) Date of Patent: Feb. 28, 2017

(54) ELECTRIC GENERATOR (71) Applicant: Francis Xavier Gentile, Los Angeles, CA (US)

(72) Inventor: Francis Xavier Gentile, Los Angeles, CA (US)

(*) Notice: Subject to any disclaimer, the term of this patent is extended or adjusted under 35 U.S.C. 154(b) by 349 days.

(21) Appl. No.: 14/479,313

(22) Filed: Sep. 6, 2014

(65) Prior Publication Data
US 2016/0072353 A1    Mar. 10, 2016

Related U.S. Application Data (60) Provisional application No. 61/874,370, filed on Sep. 6, 2013.

(51) Int. Cl.
H02K 21/12    (2006.01)
H02K 1/22     (2006.01)
H02K 5/04     (2006.01)
H02K 1/27     (2006.01)
H02K 3/47     (2006.01)

(52) U.S. Cl.
CPC .............. *H02K 5/04* (2013.01); *H02K 1/2753* (2013.01); *H02K 3/47* (2013.01)

(58) Field of Classification Search
CPC ................................. H02K 3/47; H02K 21/12
USPC ............... 310/156.38, 156.47, 156.56, 261.1
See application file for complete search history.

(56) References Cited

U.S. PATENT DOCUMENTS

| | | | |
|---|---|---|---|
| 3,452,229 A | 6/1969 | Pimlot | |
| 4,211,945 A | 7/1980 | Tawse | |
| 4,276,490 A | 6/1981 | Saldinger | |
| 6,124,702 A * | 9/2000 | Pinkerton | H02M 5/32 290/40 C |
| 6,727,668 B1 | 4/2004 | Maslov | |
| 6,777,851 B2 | 8/2004 | Maslov | |
| 6,787,951 B2 * | 9/2004 | Pyntikov | H02K 1/141 310/216.008 |
| 6,927,524 B2 | 8/2005 | Pyntikov et al. | |
| 6,949,864 B2 | 9/2005 | Maslov et al. | |
| 7,816,830 B2 | 10/2010 | Dickes | |
| 7,839,049 B2 | 11/2010 | Jansen | |
| 8,688,345 B2 * | 4/2014 | Boughtwood | B60L 7/006 123/90.17 |
| 8,688,346 B2 | 4/2014 | Boughtwood | |
| 2003/0205946 A1 | 11/2003 | Maslov | |
| 2004/0021437 A1 * | 2/2004 | Maslov | B60L 8/00 318/400.01 |
| 2004/0145323 A1 | 7/2004 | Maslov et al. | |
| 2005/0184689 A1 * | 8/2005 | Maslov | B60L 8/00 318/400.41 |
| 2009/0140526 A1 | 6/2009 | Jansen | |
| 2013/0062889 A1 | 3/2013 | Thoresen | |

* cited by examiner

Primary Examiner — Jose Gonzalez Quinones (57) ABSTRACT

A simpler to manufacture electrical machine generator or motor designed to be built of 2 dimensionally cut flat stock materials with special utility as a larger than conventional diameter electric generator that is designed to operate at lower revolutions per minute than conventional generators so as to be able to be driven by human legs or arms or wind generation at low wind speeds, or water movement at low or zero water drop distance or 'head' or other applications.

10 Claims, 8 Drawing Sheets

ELECTRIC GENERATOR

CROSS REFERENCE TO RELATED APPLICATIONS

This application claims the benefit of PPA Ser. No. 61/874,370 filed 6 Sep. 2013 by the present Inventor, which is incorporated by reference.

Disclosed as related applications and integrated into this disclosure by specific reference to previous applications by the same inventor are: PPA Ser. No. 61/874,370 filed 6 Sep. 2013

DESCRIPTION

Brief Description of the Several Views of the Drawings

Figures

ELEMENTS LETTERS

Reference Numerals

1 Shaft, Axle
2 Rotor Tooth Connect, rotor axle torsion pinned spacer or peripheral rotor spacer interlock pieces
3 Rotor
4 Spacer
5 Ball-Bearing, or other bearing
6 Stator, Box Side
7 Stator Tooth Connect, Box Closure piece
8 Interior Stator Reinforcement and bearing seat
9 Interior Stator Reinforcement and bearing seat
10 Bolt
11 Nut
12 Washer
13 Pedal
14 Magnet
15 wire zig zagged around the circumference
16 externally accessible slot for wire
17 slot of interlocking castellations
18 peripheral rotor spacer interlock pieces
19 pin

DESCRIPTION

The invention comprises a larger than conventional diameter electric generator that is designed to operate at lower revolutions per minute than conventional generators so as to be able to be driven by human legs or arms or wind generation at low wind speeds, or water movement at low or zero water drop distance or 'head' or other applications A larger diameter and less wide low rpm generator which is designed to be constructed by 2 dimensional cutting of flat stock materials.

Ideally the invention would be able to be capable of generating electricity without batteries in the system. It should generate power in the lowest wind speeds. Rapid design variation and field modification should be inherent. Low Audio and RF noise is desirable. Therefore it is desirable to avoid Slip rings which can cause sparks and there for explosions and radio interference. Slip rings are susceptible to corrosion and therefore susceptible to failure and require maintenance. The generator/alternator achieved will be quieter, and there for be less disruptive to the people working in proximity. A reduction gear or drive will not be required, with resulting decreases in noise and efficiency losses compared to gearboxes and chains etc.

The generators rotor must have the largest possible diameter to achieve usable voltages in the smallest of winds, and the low human pedaling speed and low head water wheel speeds. Physical repatching of Coils is an efficient electronic control method to effectively extract energy from wind and other small variable generation sources. Physical repatching avoids voltage drops across semiconductors and parasitic power drains in switching circuits.

Such a low rpm generator will be able to take advantage of lower winds because it can use the dense turbine blade disks associated with water pumping wind generators. The low tips speeds of the wind turbines make the wind turbine quieter. The ability to generate usable power in the lowest winds is a different definition of efficiency, in the sense of having power when you need it, without relying on heavy and expensive batteries to store energy between hoped for high wind episodes required by other generators.

To generate large wattages from a human for long periods of time, large amounts of cooling are necessary, most practically by wind. The addition of a large fan for cooling the rider will increase total work output by perhaps 20 fold per session. Humans emit perhaps 80% waste heat similarly to a passenger car, so humans over heat if you run them hard standing still as a passenger car does. Probably All exercise machines should have large user controlled fans.

Possibly the same fan that is used for the Wind Generation could be applied as a cooling blower during doldrums where human generation may be required.

In summary a low rpm generator has many applications, such as low speed wind of the historical water pumping turbine style and historical grain grinding "sail" style, human and animal power, low head water power such as surface flow using a floating paddle wheel concept and wave powered buoys The generator's edge shape is made up of flat or planar sections 7 of sufficient quantity to have some circularity, that is to say as a polygon of equal sides whose junctions fall on the same circle, a regular convex equiangular polygon. This design facilitates access to open slots for winding placement. The zig zag winding of single strands circulating around the periphery with an air core magnetic circuit is the primary design described here, as this is lightweight, the magnets are permanent and the total expected power is low.

Other configurations are possible such as prewound coils that span two opposed slot sets as 4 winding slots in total could allow a more conventional salient or lapped pole generator/motor winding to be accessed from the exterior.

Alternate configurations of more conventional circular windings could be built around two of these deeper cuts for single phase poles or across many cuts for multiphase winding schemes, wherein it is probable that magnetically conductive core material would be preferred to form the stator, layers of which could be stacked between the side panels in lieu or in addition to the generator box closure of drawing 13 etc, which is presently not shown in these drawings which focus on non magnetic structural materials and air cored windings.

The box closure pieces 7 could be make of magnetically conductive materials which could have protrusions through the center of the coils to form poles of magnetic circuits. These closure pieces could be made of 2d stacks of thin sheets of magnetically desirable steels to form the cap and pole protrusion utilizing a of a 2d manufacturing method.

Other designs polygonal designs with unequal sides that do not fall on the same circle could allow the creation of shapes of footings for the generator, and stair cases to climb the generator, however the externally accessed slots would become very deep and less convenient.

Figure 1:
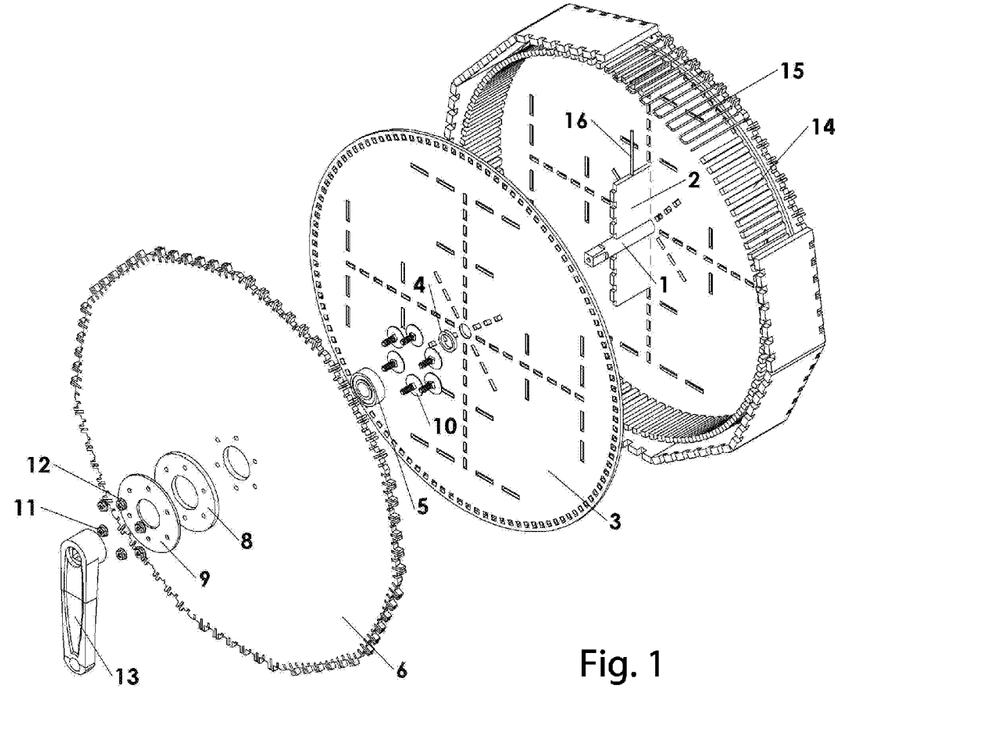
FIG. 1. An exploded view of the Generator.

FIG. 1. An exploded view of the Generator.

Drawing page 10a. At the top a drawing of circular rotor disk, one of two, with two examples of castellated spacers (axle torsion spacer, peripheral spacer) placed as many more would be before the second disk is placed on top and united to form the generator rotor.

Figure 2:
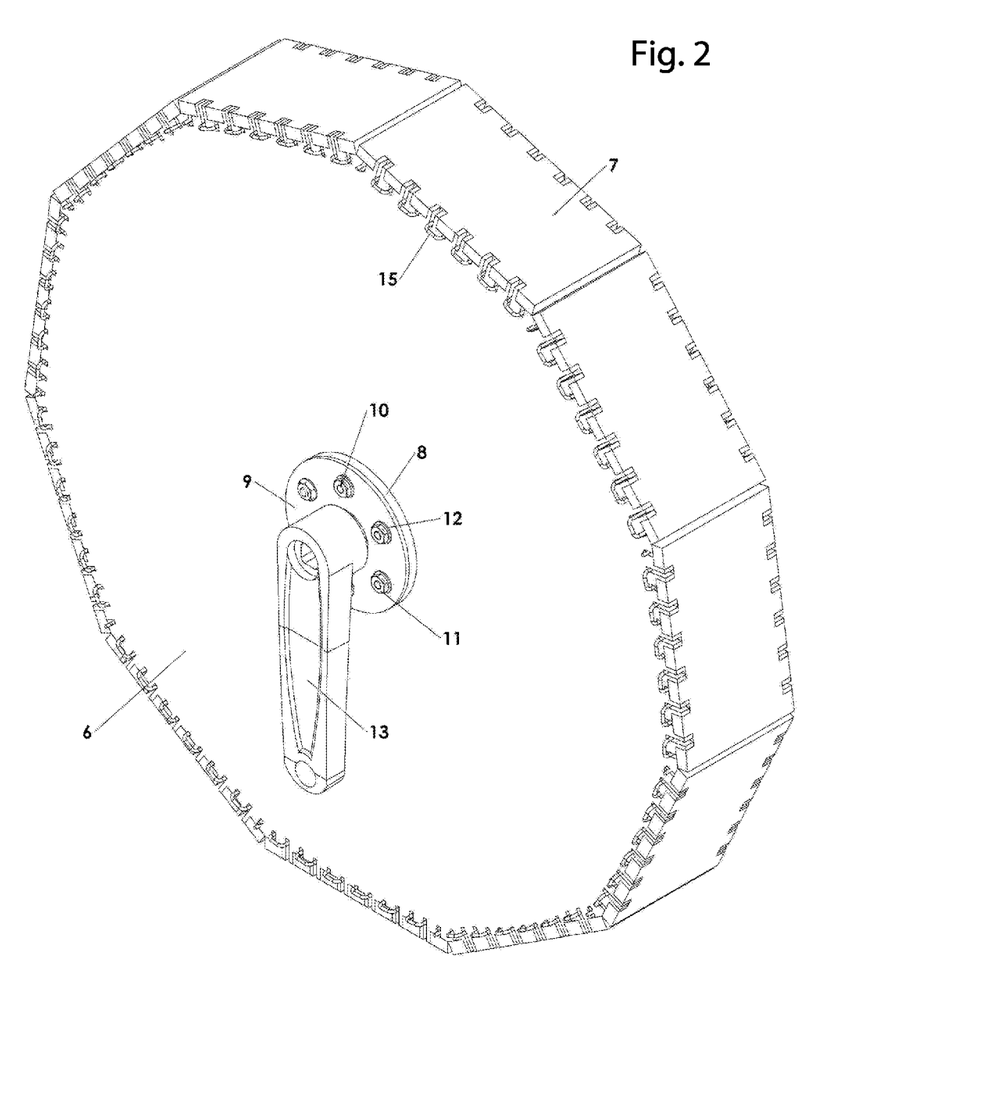
FIG. 2. An outside view of the generator.

FIG. 2. An outside view of the generator.

Figure 3:
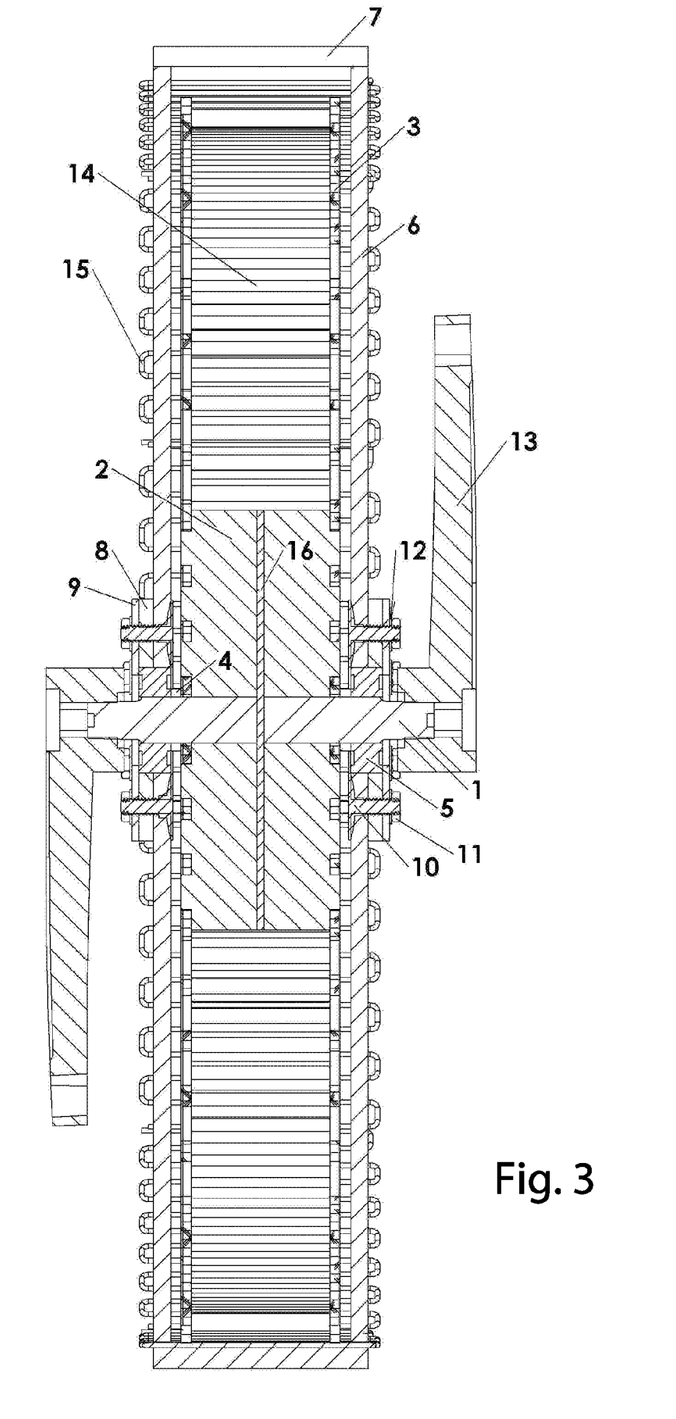
FIG. 3. A sectional view of the generator.
Figure 4:
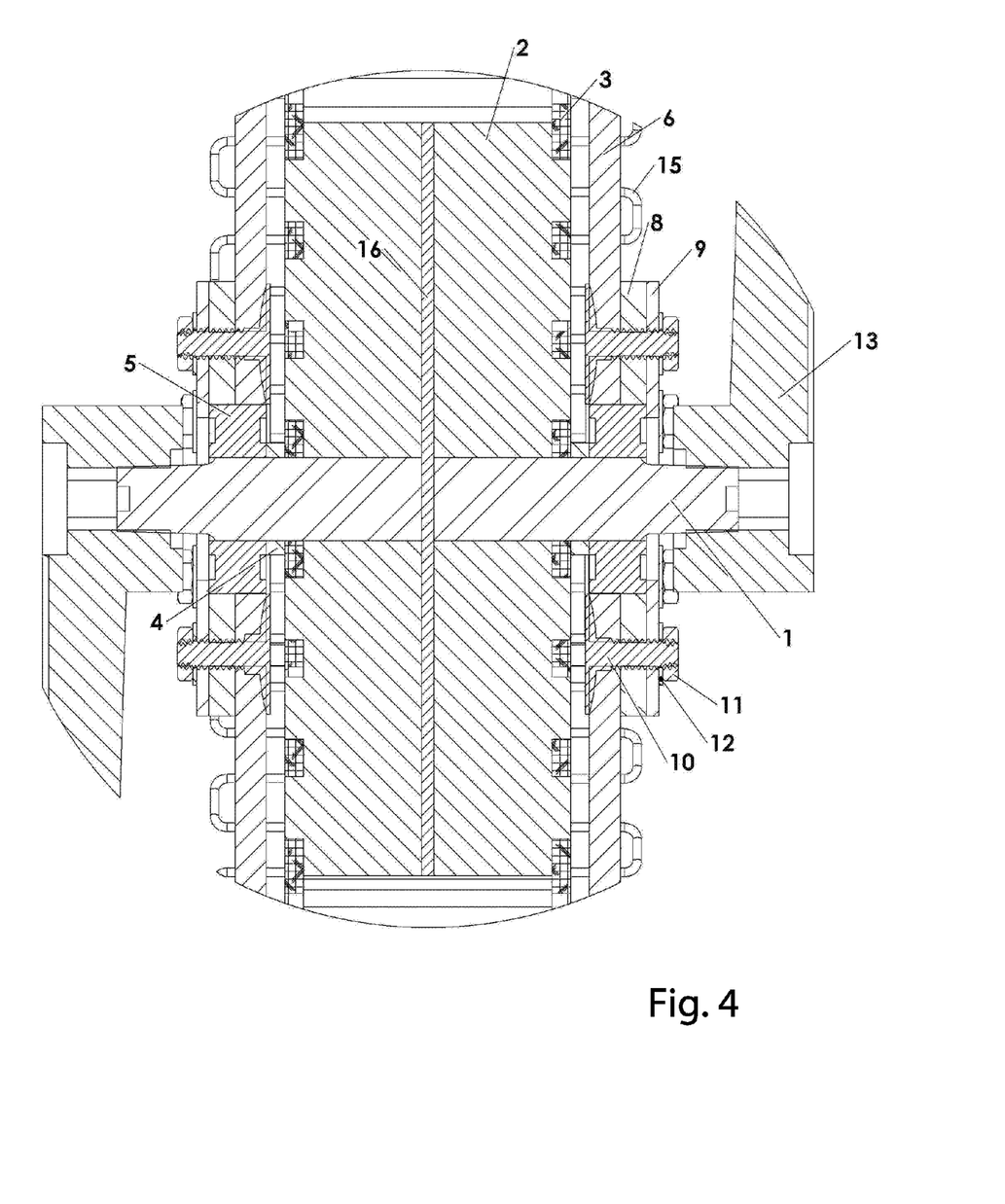
FIG. 4 A detail view of the axle 1 of the generator as seen in FIG. 3.

FIG. 3. A sectional view of the generator.

showing how a metal plate 8 could form a harder bearing seat material such as metal when combined with a stator side made of a lighter softer material such as wood, FIG. 4 A detail view of the axle 1 of the generator as seen in FIG. 3.

In the Drawing FIG. 4. sectional bisection two dimensional drawing of a the comprising a pin or spirol pin or glue or other means, shown connecting to the axle torsion spacers thru the axle 1 or (so called "bracket" in the bicycle industry), and the castellated interconnection with the rotor plates are shown, and bearings that would allow the pedals to rotate the axle and the rotor to be rotated by the spirol pin and the castellated spacers which are attached to form the rotor.

Drawing page 12. A partially bisected elevation view of one side of the external motor frame and the pedal axle wherein the pedal axle bearing is seated on a double thickness of material around the axle area that is also located with holes for bolt, rivets or other connection means where the total weight of the motor frame might be reduced from having to be cut from a material that is as thick as the bearing seating area.

Figure 5:
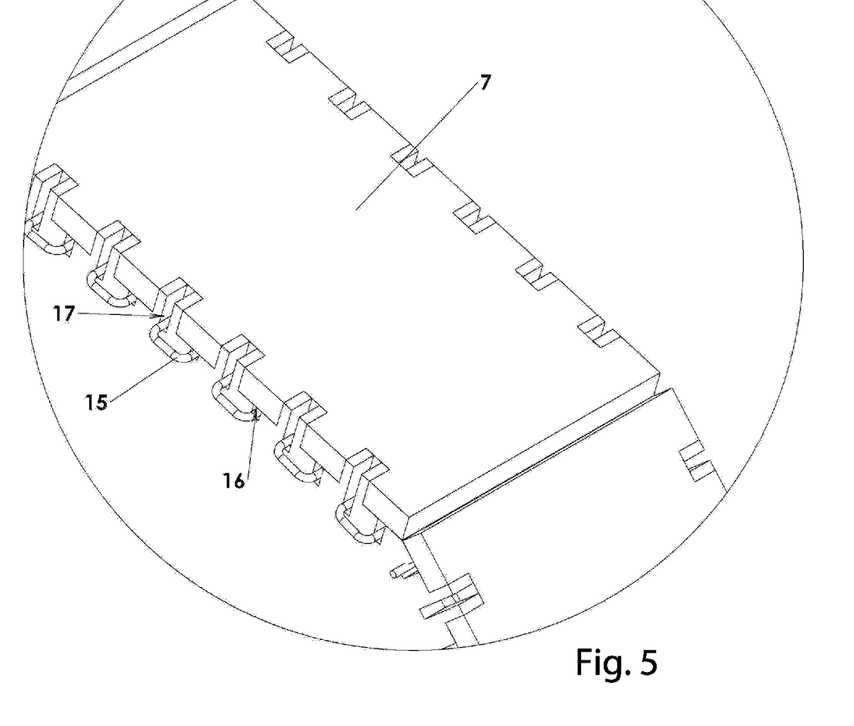
FIG. 5 A detail view of box closure piece 7 edge of the generator a seen in FIG. 2
FIG. 6 The edge of the box side 6 without a closure piece 7 showing castellations and slots or teeth on stator 6 stator box side edge.

FIG. 5 A detail view of box closure piece 7 edge of the generator a seen in FIG. 2

Figure 6:
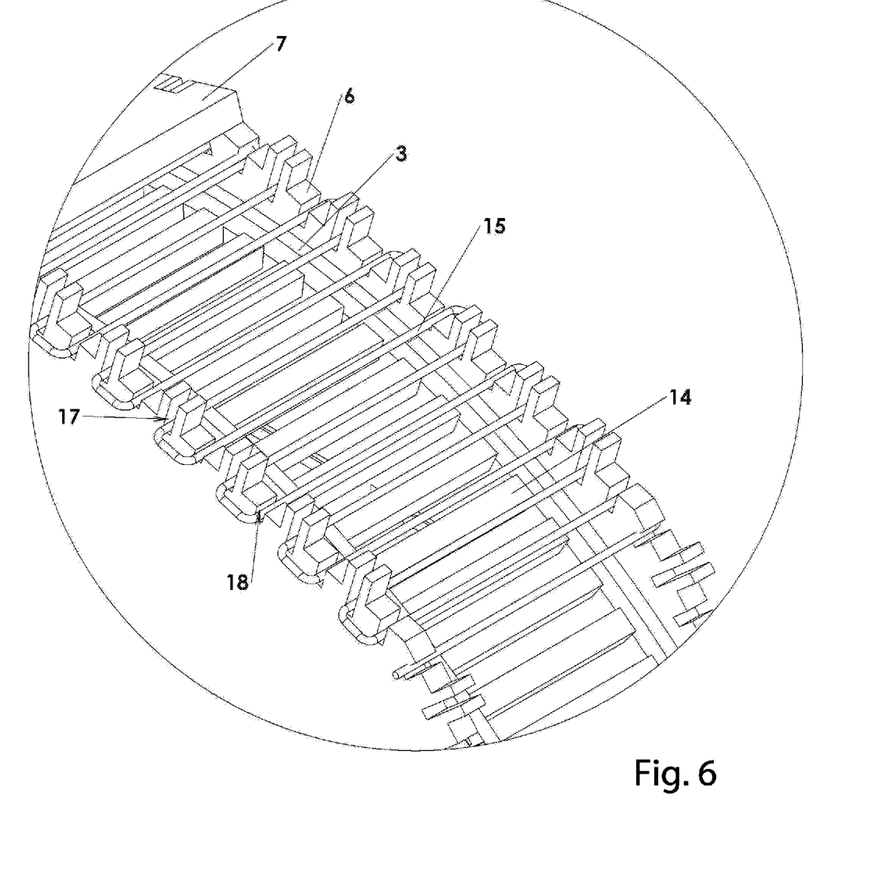

FIG. 6 The edge of the box side 6 without a closure piece 7 showing castellations and slots or teeth on stator 6 stator box side edge.

Figure 7:
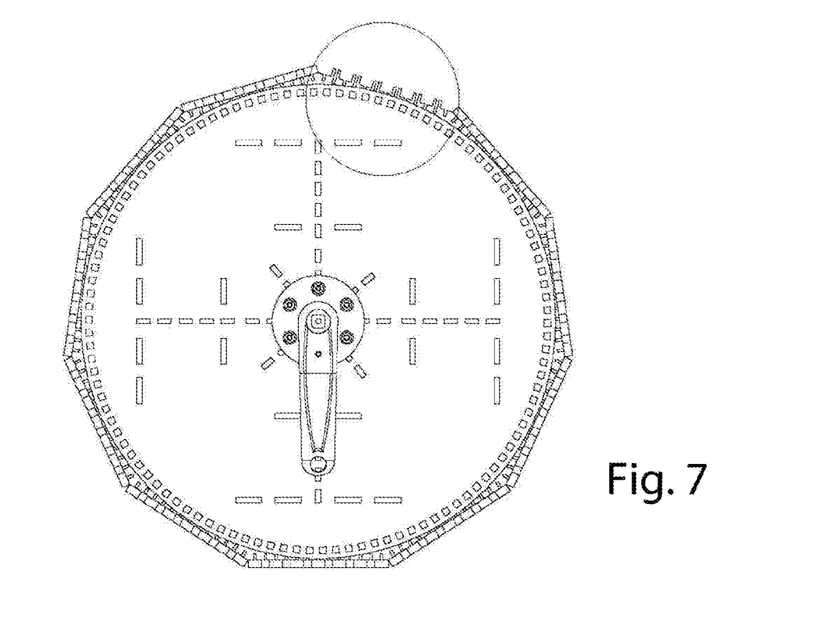
FIG. 7 a side view of the generator with one stator box closure 7 removed and a circle B to show the origin of the detail magnification of FIG. 8.
Figure 8:
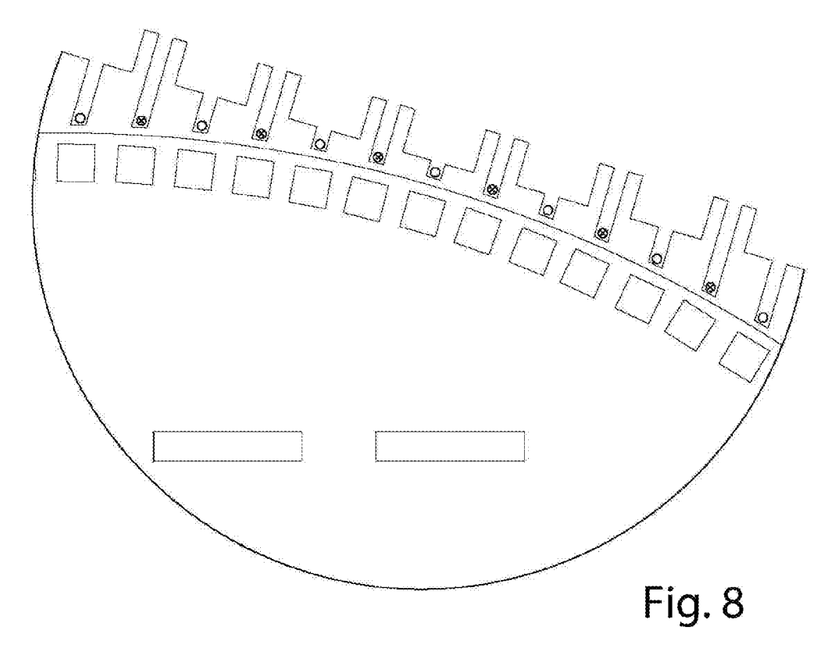
FIG. 8 A detail side view of stator 6 stator box side edge including wires stator winding wires in section with cross mark convention to show alternating electromotive voltage direction in alternate winding slots in opposition to rotor magnets 14 of alternating magnetic polarity.

FIG. 7 a side view of the generator with one stator box closure 7 removed and a circle B to show the origin of the detail magnification of FIG. 8.

FIG. 8 A detail side view of stator 6 stator box side edge including wires stator winding wires in section with cross mark convention to show alternating electromotive voltage direction in alternate winding slots in opposition to rotor magnets 14 of alternating magnetic polarity.

A detail elevation of one of the flat sections of the polygonal edge of the generator wherein the castellations have additional deeper cut slots in the edge down to very near the operating edge of the moving generator rotor, these deeper cuts being placed in locations that still allow the structural interlocking and the cuts through the castellation can be used as screw holes for closure wherein these deeper cut slots are used to lay in zig zag conductor stator wiring from the exterior without the need to thread through a closed hole.

Figure 9:
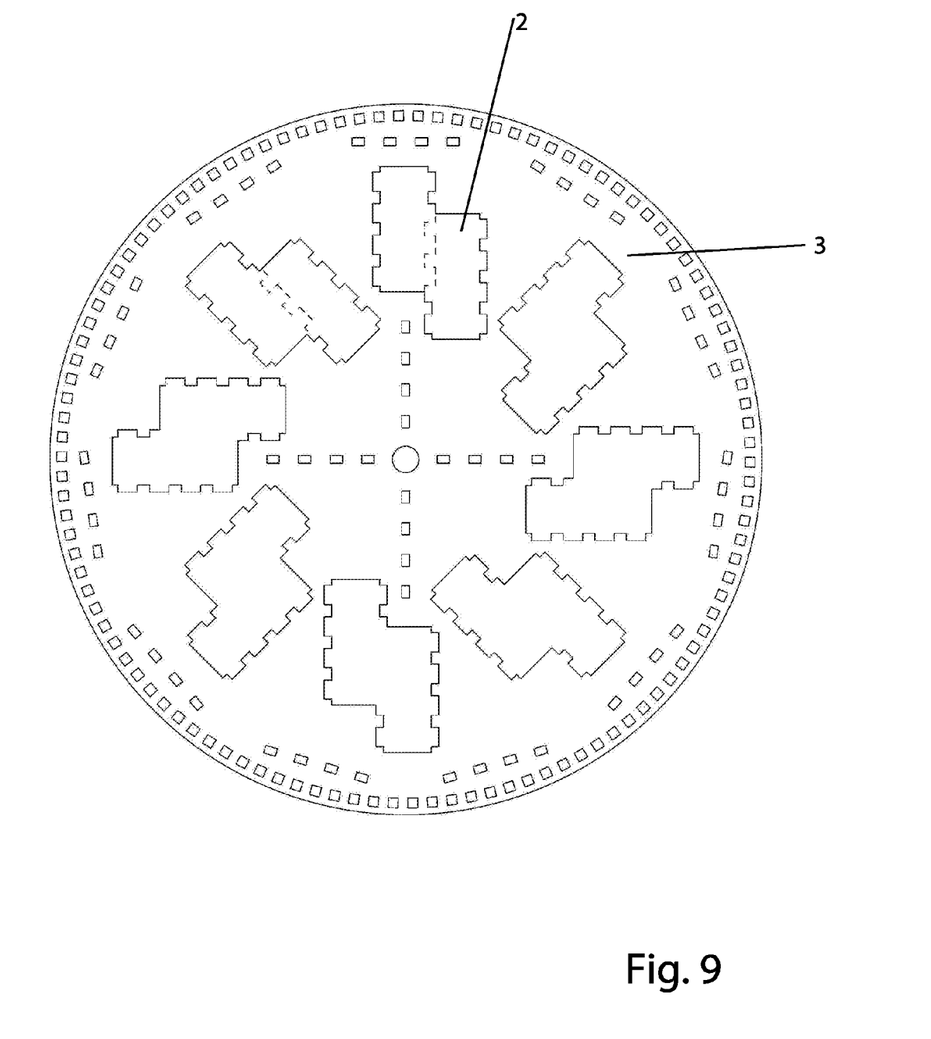
FIG. 9 A view of a rotor cut out nesting method where the pieces 2 are also litening holes in the rotor, and may have a shared cut between two pieces with calculated kerf correction.

FIG. 9 A view of a rotor cut out nesting method where the pieces 2 are also litening holes in the rotor, and may have a shared cut between two pieces with calculated kerf correction wherein two castellated pieces are offset and adjacent so that they share a cutting line to form two sides at once, thus saving time on the cutting machine. The exterior static frame of the machine can be litened by similar double use of cutouts or 'nesting' as in this drawing. Also shown are holes for castellated peripheral rotor spacer plates 2, whose position could be circular but may also be canted to towards 45% from the circular orientation to provide stiffness and warp resistance to the stator, at some cost in air friction (windage) that could be translated into intentional blowing similar to a vacuum cleaner turbine if the application calls for such function Nothing stated herein precludes or excludes other combinations and arrangements of the methods and mechanisms disclosed herein.

I claim:

1. An electrical machine which is designed to be constructed by 2 dimensional cutting of flat stock materials to perform as a generator or motor comprising an external box, stator, motor frame of two sides which hold the axle in the center, wherein the peripheral edge is shaped as flat or planar sections of sufficient quantity to have some circularity, that is to say as a polygon of equal sides whose junctions fall on the same circle, a regular convex equiangular polygon, whose two sides are closed by flat closure pieces that interlock with the 2 sides of the stator by castellations, which can be additionally structurally connected by various means, wherein additional deeper cut slots in the in said motorframe's periphery reach inside to very near the moving peripheral edge of the internal axle driven moving generator rotor, these deeper cuts being placed in locations that still allow the castellated stator and flat closure pieces to be structural interlocking and said deeper cuts can be used as fastener receptacles holes for said flat closure pieces, wherein said deeper cut slots are used to lay in zig zag conductor stator wiring from the exterior without the need to thread all the wire through closed holes, alternatively stated, as an open wire winding access closed by a castellated cover, wherein the windings are of said zig zag style where a single wire proceeds around the entire circumference of the generator frame, where each zig would see the opposite magnetic polarity of the next zag in the wire while being driven by alternating north and south permanent magnets mounted on the rotor, wherein the voltage generated in the wire by said zig or zag would be of the same momentary voltage polarity direction due to the hand rule of magnetic flux direction being reversed as said wire zigs or zags from one side of the frame to the other side of said motor frame, wherein each wire winding which has been zig zagged around the circumference of the motor frame 6 can be connected in series or parallel with additional wires that have also been zig zagged around the circumference of the same motor in the same deeper slots, wherein said magnets are placed across opposing holes just below the edge of the periphery of the two plates which make up the rotor sides, and comprising, a connection between the axle and the rotor transmitting the rotating forces to the rotor plates by castellated spacer plate which distributes the forces from the axle attachment by pin or spirol pin or glue or other means thru the spacer and into the rotor plates, and comprising bearings that allow the rotation of the axle, said bearings are held in place by a layering of bolted motor frame reinforcing plates cut from flat stock material wherein the inner plate is serving as a bearing seat and the outer plate serving as to clamp the bearings outer race so the inner race can clamp on each side against spacer and the rotor pieces, Further comprising additional castellated spacer plates similar to said axle castellated spacer plates distributed around the rotor to maintain the structural rigidity of the rotor.

2. The method of manufacturing an electrical machine which is designed to be constructed by 2 dimensional cutting of flat stock materials to perform as a generator or motor comprising an external box, stator, motor frame of two sides which hold the axle in the center, wherein the peripheral edge is shaped as flat or planar sections of sufficient quantity to have some circularity, that is to say as a polygon of equal sides whose junctions fall on the same circle, a regular convex equiangular polygon, whose two sides are closed by flat closure pieces that interlock with the 2 sides of the stator by castellations, which can be additionally structurally connected by various means, wherein additional deeper cut slots in the in said motorframe's periphery reach inside to very near the moving peripheral edge of the internal axle driven moving generator rotor, these deeper cuts being placed in locations that still allow the castellated stator and flat closure pieces to be structural interlocking and said deeper cuts can be used as fastener receptacles holes for said flat closure pieces, wherein said deeper cut slots are used to lay in zig zag conductor stator wiring from the exterior without the need to thread all the wire through closed holes, alternatively stated, as an open wire winding access closed by a castellated cover, wherein the windings are of said zig zag style where a single wire proceeds around the entire circumference of the generator frame, where each zig would see the opposite magnetic polarity of the next zag in the wire while being driven by alternating north and south permanent magnets mounted on the rotor, wherein the voltage generated in the wire by said zig or zag would be of the same momentary voltage polarity direction due to the hand rule of magnetic flux direction being reversed as said wire zigs or zags from one side of the frame to the other side of said motor frame, wherein each wire winding which has been zig zagged around the circumference of the motor frame 6 can be connected in series or parallel with additional wires that have also been zig zagged around the circumference of the same motor in the same deeper slots, wherein said magnets are placed across opposing holes just below the edge of the periphery of the two plates which make up the rotor sides, and comprising, a connection between the axle and the rotor transmitting the rotating forces to the rotor plates by castellated spacer plate which distributes the forces from the axle attachment by pin or spirol pin or glue or other means thru the spacer and into the rotor plates, and comprising bearings that allow the rotation of the axle, said bearings are held in place by a layering of bolted motor frame reinforcing plates cut from flat stock material wherein the inner plate is serving as a bearing seat and the outer plate serving as to clamp the bearings outer race so the inner race can clamp on each side against spacer and the rotor pieces, Further comprising additional castellated spacer plates similar to said axle castellated spacer plates distributed around the rotor to maintain the structural rigidity of the rotor.

3. The electrical machine as in claim 1 or 2 wherein said magnets are square and go into square holes on said rotor pieces.

4. The electrical machine as in claim 1 or 2 comprising said rotor driven by a one way clutch on said axle.

5. The electrical machine as in claim 1 or 2 comprising said deeper cuts are placed in the troughs and peaks of the structural castellations.

6. The electrical machine as in claim 1 or 2 comprising additional castellated spacer plates similar to said axle castellated spacer plates distributed around the interior of and between the side panels of said rotor to maintain the structural rigidity of the rotor wherein said spacer plates long dimensions are not near to being perpendicular or parallel to the rotor radius.

7. The electrical machine as in claim 1 or 2 comprising a polygon of unequal sides that do not fall on the same circle.

8. The electrical machine as in claim 1 or 2 comprising alternate configurations of more conventional windings built around two of these deeper cuts for single phase poles or across many cuts for multiphase winding schemes that span two opposed slot sets totaling 4 winding slots in total creating a more conventional salient or lapped pole generator/motor winding to be installed from the exterior of the machine.

9. The electrical machine as in claim 1 or 2 or 8 comprising polygonal generator plates box closure pieces are made of magnetically conductive materials which could have 3d shaped protrusions protruding through the center of the coils or opposed poles to form poles of magnetic circuits wherein these closure pieces are made of 2d stacks of thin sheets of magnetically desirable steels to form the generator box closure plates box closure pieces and pole protrusion utilizing a 2 d manufacturing method where the long dimension of said stack sheets is oriented around the circumference of said electric machine.

10. The electrical machine as in claim 1 or 2 comprising a rotor cut out nesting method where the spacer interlock pieces are cut out to form litening holes in the rotor, and have a shared cut between two pieces with calculated kerf correction.

* * * * *